US005719663A

United States Patent [19]
Hirai et al.

[11] Patent Number: 5,719,663
[45] Date of Patent: Feb. 17, 1998

[54] RANGE FINDER APPARATUS

[75] Inventors: Toshiaki Hirai; Atsushi Takami, both of Yotsukaido, Japan

[73] Assignee: Seiko Precision Inc., Japan

[21] Appl. No.: 413,592

[22] Filed: Mar. 30, 1995

[30] Foreign Application Priority Data

Apr. 12, 1994 [JP] Japan .................. 6-073357

[51] Int. Cl.$^6$ .................. G01C 3/00; G03B 3/00
[52] U.S. Cl. .................. 356/3.03; 250/201.6; 356/3.04; 356/3.06; 356/3.07; 396/106
[58] Field of Search .................. 250/201.6; 354/403; 356/3.01–3.16; 396/106

[56] References Cited

U.S. PATENT DOCUMENTS

| | | |
|---|---|---|
| 4,375,332 | 3/1983 | Yokota et al. |
| 4,464,038 | 8/1984 | Nanba .................. 354/403 |
| 5,150,146 | 9/1992 | Ueda et al. .................. 354/403 |
| 5,196,689 | 3/1993 | Sugita et al. .................. 250/206.1 |

*Primary Examiner*—Stephen C. Buczinski
*Attorney, Agent, or Firm*—Adams & Wilks

[57] ABSTRACT

An active type range finder apparatus comprises a light projecting element having a base, a lead frame disposed on the base, at least one light emitting member disposed on the lead frame for emitting light to a subject, and at least one control terminal disposed on the base for controlling the light emitting member. A light receiving element is disposed at a base length from the light projecting element for receiving light reflected by the subject. The lead frame and the control terminal of the light projecting element have end portions arranged outside an extension region of the light emitting member in a direction of the base length. When the light emitting member is illuminated, scattered light is prevented from being projected within the extension region of the light emitting member in the direction of the base length, thereby preventing distance measurement errors.

19 Claims, 6 Drawing Sheets

BASE LENGTH DIRECTION — 18

BASE LENGTH DIRECTION

BASE LENGTH DIRECTION

RANGE FINDER APPARATUS

BACKGROUND OF THE INVENTION

The present invention relates to a range finder apparatus for measuring distances using a photoelectric device, and in particular to an improved light-projecting element for projecting a light beam for measurement.

A range finder apparatus is incorporated, for example, in an auto-focus device in a camera. The range finding apparatus projects an infrared light beam towards a subject to be photographed, receives the light reflected therefrom, and performs ectro-optical conversion to detect the distance to the subject. FIG. 7 and FIG. 8 show a plan view and an elevation cross-sectional view, respectively of a conventional light-projecting element used as a light source in the range finder apparatus. The light-projecting element shown in FIG. 7 is constructed by fixing a light-emitting member 82 to an indented portion 84a of a lead frame 84 and attaching it to a base 81. The light-projecting element of this structure has the light-emitting member 82 mounted on the lead frame 84, and is connected to terminals 86 by bonding wires 85. When the light-emitting member 82 is lighted, the end portion 86a of the terminal 86 and the end portion 84a of the lead frame 84 are illuminated and beam losses due to scattering and the like easily occurs.

FIG. 9 shows a plan view of a conventional light-receiving element used in the range finder apparatus. The light-receiving element comprises a lead frame 94 and three pairs of terminals 96 and three light receiving members 92 mounted on the lead frame 94.

As shown in FIG. 8, the light-projecting element having the light-emitting member 82 attached to the base 81 is provided with a protective member 83 at the front of the light-emitting member 82. Furthermore, the terminal 86 provided in the base 81 and the light-emitting member 82 are connected by the bonding wire 85, and the light-emitting member 82 is lighted by a control signal output from the terminal 86. In this case, an indented portion 84a for reflecting scattered light towards the front is formed in the base 81, the light-emitting member 82 being attached so as to be located in this indented portion 84a.

The light-projecting element shown in FIGS. 7 and 8 generates a primary projection beam $\underline{a}$ radiated from the light-emitting member 82 which forms an image on each of the light-receiving members 92 of the conventional light-receiving element, and simultaneously generates secondary beams $\underline{b}$ and $\underline{c}$ scattered by the end portions 84b and 86a which forms images on the light-receiving members 92, as shown in FIG. 9. Since these secondary beams $\underline{b}$ and $\underline{c}$ are projected towards the subject from the periphery of the primary projection beam $\underline{a}$, they cause measurement errors when performing a measurement with the primary projection beam $\underline{a}$ as being projected a light spot. Specifically, when the subject is at a near position and has a reflective property, this effect becomes larger and renders an accurate measurement impossible.

SUMMARY OF THE INVENTION

The present invention was arrived at in consideration of the above problems, and while a fundamental structure is shown in FIG. 8, the object of the invention is to provide a range finder apparatus capable of restricting the effect of the secondary beams using an improved light-projecting element which can project a light beam for accurate distance measurement.

The present invention, in order to solve the problems in the conventional art, comprises an active type range finder apparatus which takes a distance between a light-projecting element and a light-receiving element as a base length and measures a distance to a subject, and locates the end portions of terminals of a lead frame for controlling a light-emitting member of the light-projecting element outside an extension range in the base length direction of the light-emitting member.

When the light-emitting member is lighted by control signals from the terminals and the light beam emitted from the light-emitting member is a direct beam, secondary beams may be reflected by the end portions of the lead frame and the terminals. However, because the end portions of the lead frame and the terminals are located outside an extension range in the base length direction of the light-emitting member, they are outside the measurement range of a light-receiving element. Accordingly, secondary beams do not have an adverse effect on the distance measurement and an accurate measurement is possible.

BRIEF DESCRIPTION OF THE DRAWINGS

These and other features, aspects and advantages of the present invention will be better understood with reference to the following description, appended claims and accompanying drawings, wherein:

BRIEF DESCRIPTION OF THE PREFERRED EMBODIMENTS

Figure 1:
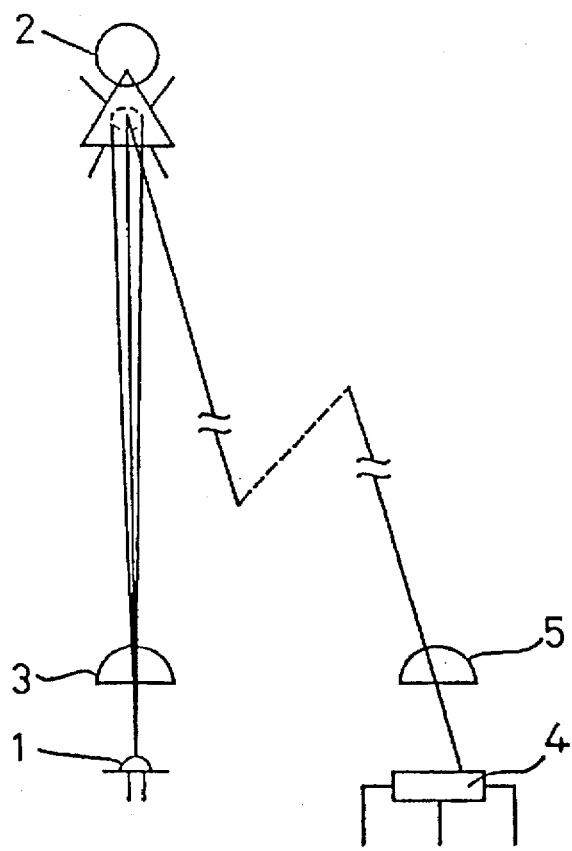
FIG. 1 is a an overall view of the range finder apparatus according to the present invention.

Hereafter, embodiments of the present invention will be explained in conjunction with FIGS. 1–6. FIG. 1 shows an active type range finder apparatus employed in an auto-focus device in a camera, and comprises a light-projecting element 1 such as an infrared light beam emitting diode or the like, and a light-projecting lens 3 for collecting infrared light beams projected from the light-projecting element 1, forming them into a bundle of light beams, and projecting light towards a subject 2. Also, a light-receiving element 4 separated from the light-projecting element 1 by a predetermined distance (base length), for example a PSD (Position Sensitive Diode), is provided for receiving light reflected from the subject 2. Further, a light-receiving lens 5 is provided in front of the light-receiving element 4 and forms an image of the reflected light on the light-receiving element 4.

Figure 2:
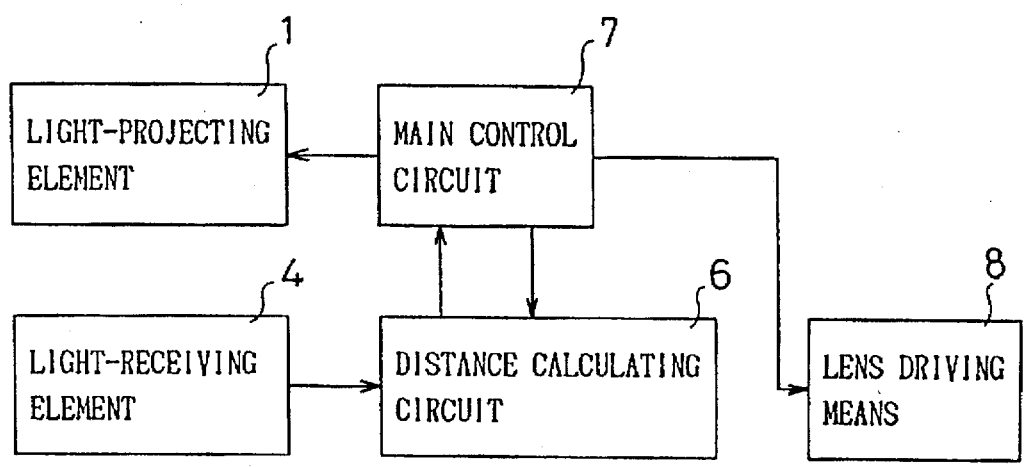
FIG. 2 is a circuit block of a control circuit used in the range finder apparatus according to the present invention.

A control circuit as shown in FIG. 2 is mounted in the range finder apparatus. A bundle of beams having an acute light-projection angle is projected towards the subject 2 from the light-projecting element 1, and the light reflected from the subject is received by the light-receiving element 4. The distance to the subject 2 is calculated by a distance calculating circuit 6 based on a signal output from the light-receiving element 4. Thereafter, the distance to the subject 2 is output from a main control circuit 7 as a signal to a lens-driving means 8.

Figure 3:
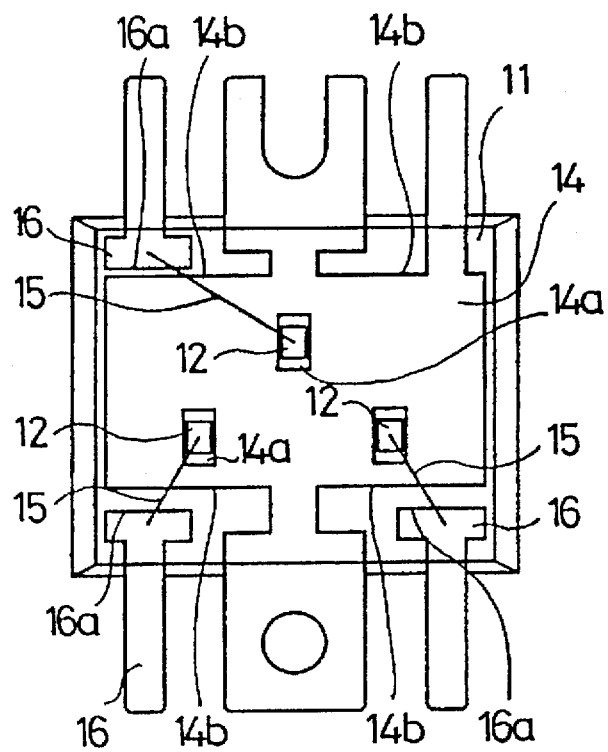
FIG. 3 is a plan view of a first embodiment of the present invention.
Figure 4:
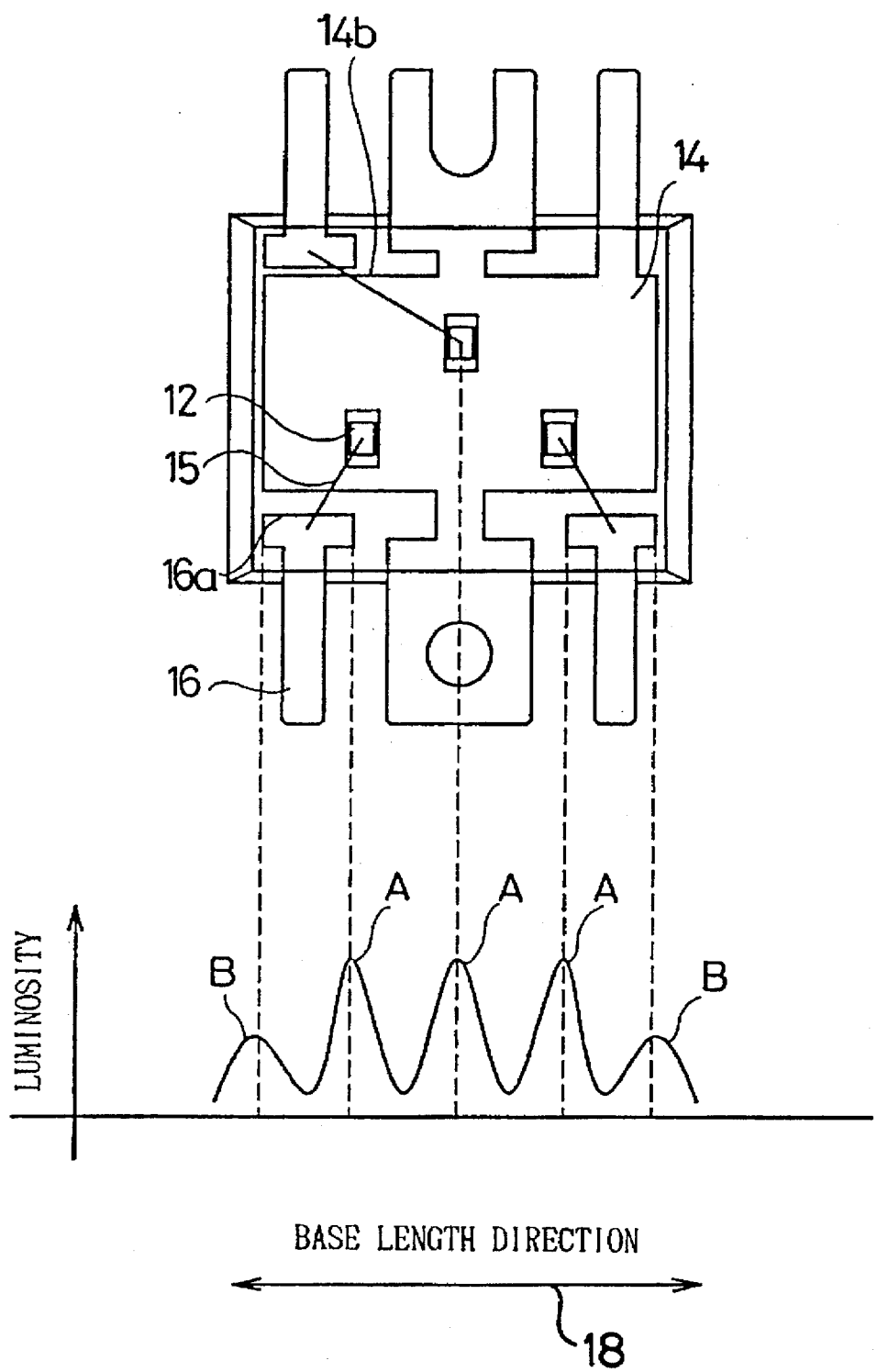
FIG. 4 shows a light emission output signal together with the range finder apparatus of the present invention.

FIG. 3 shows a first embodiment of a light-projecting element 1 of the present invention having the above structure. FIG. 4 shows light emission luminosity levels of various portions of the light projecting element 1 when light-emitting members 12 are illuminated. Three light-emitting members 12 are disposed on a base 11, each of these light-emitting members 12 being connected via bonding wires 15 to terminals 16, respectively, provided on the base 11. Each each of the light-emitting members 12 is individually controlled by an input of a control signal from its corresponding terminal 16. Furthermore, a protective member 13 is provided on the light-projection side of the base 11. The protective member 13 is attached to the base 11 to cover the front portion of the light-emitting members 12, and well known light-projection windows for transmitting light beams are formed in portions facing each of the light-emitting members 12.

Further, the light-emitting members 12 are disposed on the base 11 after, being mounted in a respective indented portion 14a of a lead frame 14. An end portion 14b of the lead frame 14 and end portions 16a of the terminals 16 are disposed outside an extension range in the base length direction, indicated by an arrow 18, of the light-emitting member 12 and the indented portion 14a.

Figure 5:
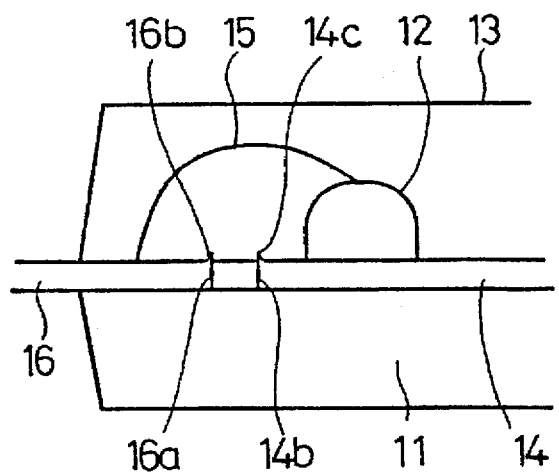
FIG. 5 is a fragmentary cross-sectional view of a second embodiment of the present invention.

FIG. 5 shows a cross-sectional view of the main part of another embodiment of the light-projecting element 1, wherein an indented portion is not provided in the lead frame 14 and the light-emitting member 12 is directly mounted on the lead frame 14. The terminals 16 and the lead frame 14 are formed by a pressing process from metal materials, therefore burrs 16b and 14c are formed during processing so as to project from the end portions 16a and 14b.

Figure 6:
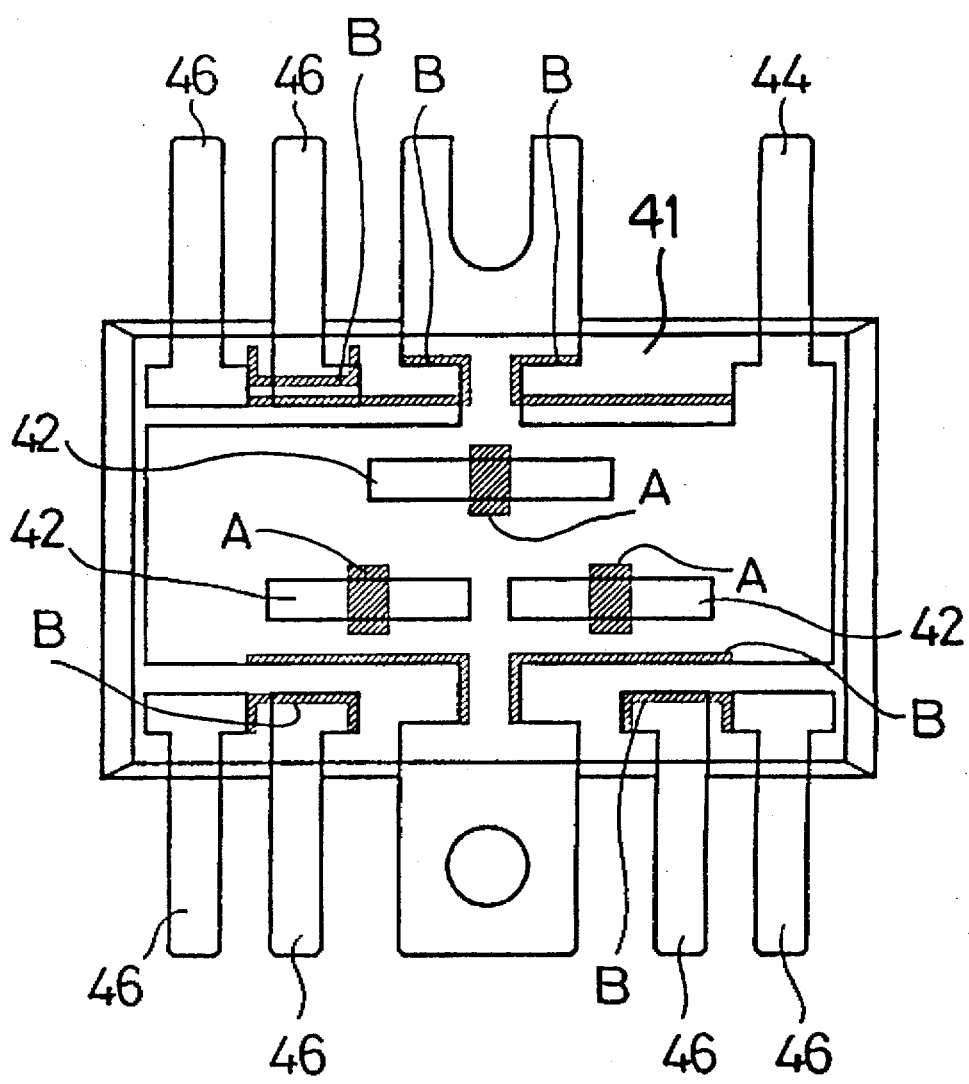
FIG. 6 is a plan view of a light-receiving element used in the light-receiving portion of the present invention.
Figure 7:
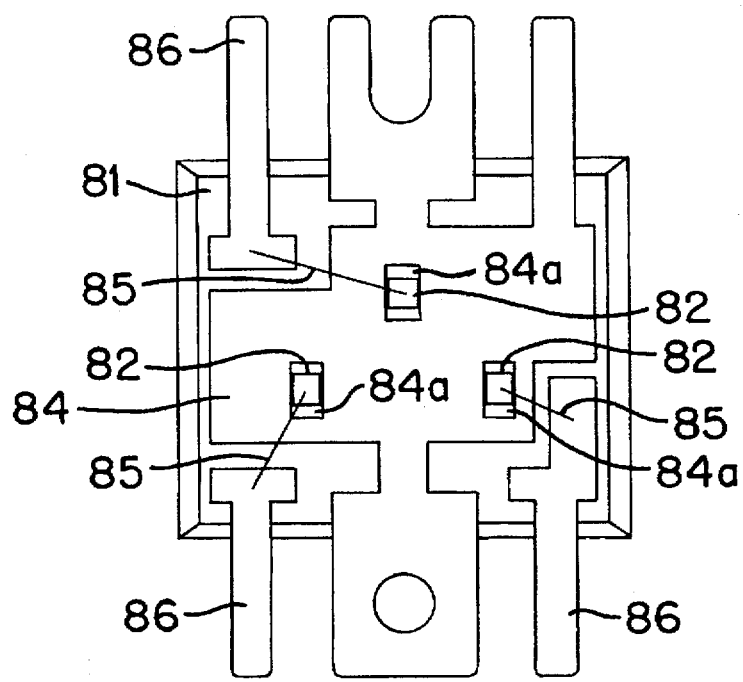
FIG. 7 is a plan view of a conventional light-projecting element.
Figure 8:
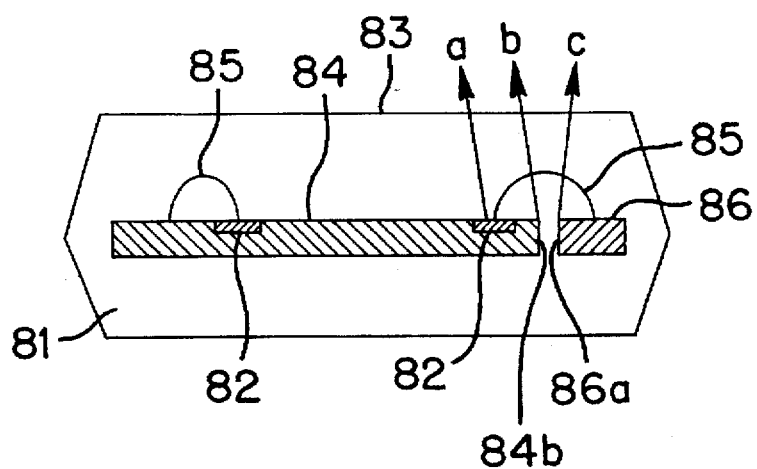
FIG. 8 is a cross-sectional view of the conventional light-projecting element.
Figure 9:
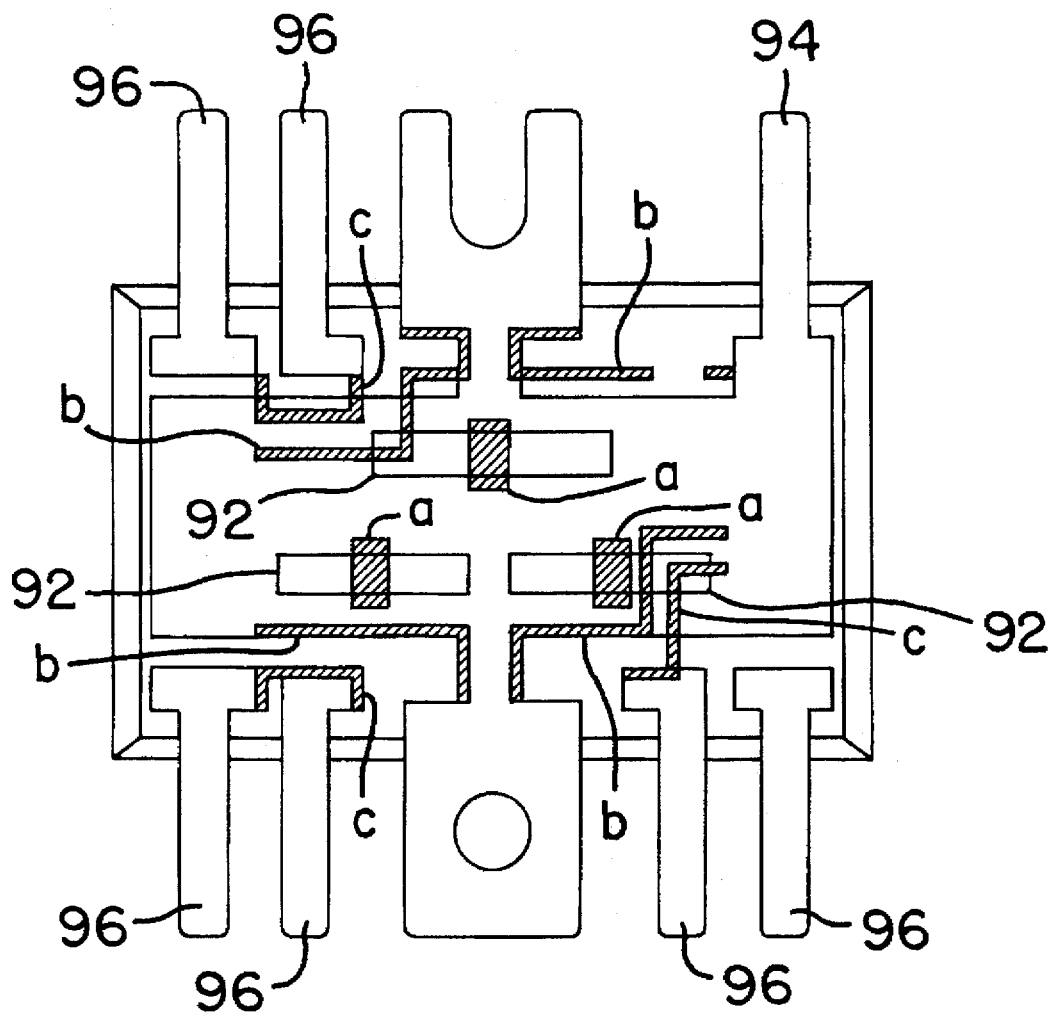
FIG. 9 is a plan view of a conventional light-receiving element.

In FIG. 6, the lead frame 44 on which three pairs of terminals 46 and three light-receiving members 42 are mounted is disposed on the base 41, both ends of each of the light-receiving members 42 being connected to a corresponding pair of terminals 46 by a known wiring method.

An operating method for the light-projecting element 1 and light-receiving element 4 of the above structures will now be explained, then a control signal is output to the light-projecting element 1 by the main control circuit 7, the light-emitting members 12 sequentially emit light and project light towards the subject 2 via the lens 3. The light reflected by the subject 2 passes through the lens 5 and forms an image on the light-receiving member 42 on the surface of the light-receiving element 4. At this time, light-emission outputs A of the light-emitting members 12 form an image on each of the light-receiving members 42, and scattered light outputs B of the end portions 16a and 14b of the terminals 16 and the lead frame 14, respectively, form an image outside of the light-receiving member 42 of the light-receiving element 4, as shown in FIG. 6. In other words, the scattered light output B does not form an image on the light-receiving member 42, and therefore does not interfere with the measurement signal, thereby preventing measurement errors due to secondary light beams from the light-emission members 12. Specifically because the end portions 16a and 14b are formed outside the extension rings in the base length direction of the light-emitting members 12, even there the reflected light corresponding to the distance to the subject forms an image in a position shifted in the base length direction, it does not produce in output as a light-receiving signal with respect to the light-receiving members 42, and consequently does not interfere with measurement signals.

Moreover, the light-projecting element 1 in FIG. 3 is constructed such that the same effects occur not only in respect light-emitting members 12, but also with respect to the size of the indented portion 14a of the lead frame 14, due to improvement of the light emission efficiency thereof.

It should be noted that the present invention is not limited to the above embodiments and various modifications can be made thereto. For example, the present invention can be similarly applied as a light-projecting element of a range finder apparatus other than that used in a camera, and can also be applied to a light emitting body substantially equal to a light-emitting member 12 even in a case where an objective lens is employed at the front of the light-emitting member 12 in order to obtain the same effect as the indented portion 14a of the lead frame. In addition, the number of light-emitting members may also be suitably modified.

According to the present invention as described above, since secondary light beams from light-emitting members form images on the outside of the measurement region, it is possible to obtain only effective light beams which are essential for measurement to be input to light-receiving members, among the light beams which are reflected from the subject, so that measurement can be accurately performed.

What is claimed is:

1. An active type range finder apparatus, comprising: a light projecting element having a base, a lead frame disposed on the base, a plurality of light emitting members disposed on the lead frame for emitting light to a subject, and a plurality of control terminals disposed on the base for controlling the light emitting members; and a light receiving element having a plurality of light receiving members and being disposed at a base length from the light projecting element for receiving light reflected by the subject; wherein each of the light emitting members has an extension region extending along an axis which is parallel to a direction of the base length, and the lead frame and the control terminals have end portions, none of which lie on each said axis of the extension regions of the light emitting members, so that the light emitting members emit light to a subject which reflects the light to form an image on the light receiving element, and scattered light from the end portions of the lead frame and the control terminals forms an image outside of the light receiving members.

2. An active type range finder apparatus as claimed in claim 1; wherein each of the light emitting members comprises an infrared light emitting diode.

3. An active type range finder apparatus as claimed in 1; wherein the light receiving element comprises a base and a lead frame disposed on the base; and wherein the plurality of light receiving members are disposed on the lead frame.

4. An active type range finder apparatus as claimed in claim 3; wherein each of the light receiving members comprises a position sensitive diode.

5. An active type range finder apparatus, comprising: a light projecting element having a base, a lead frame disposed on the base and having a plurality of indented portions, at least one light emitting member disposed in each of the indented portions of the lead frame for emitting light to a subject, and a plurality of control terminals disposed on the base for controlling the light emitting members; and a light receiving element having a plurality of light receiving members and being disposed at a base length from the light projecting element for receiving light reflected by the subject; wherein each of the indented portions of the lead frame has an extension region extending along an axis which is parallel to a direction of the base length and the lead frame and the control terminals have end portions, none of which lie on each said axis of the extension regions of the indented portions, so that the light emitting members emit light to a subject which reflects the light to form an image on the light receiving element, and scattered light from the end portions of the lead frame and the control terminals forms an image outside of the light receiving members.

6. An active type range finder apparatus as claimed in claim 5; wherein each of the light emitting members comprises an infrared light emitting diode.

7. An active type range finder apparatus as claimed in claim 5; wherein the light receiving element comprises a base and a lead frame disposed on the base; and wherein the plurality of light receiving members are disposed on the lead frame.

8. An active type range finder apparatus as claimed in claim 7; wherein each of the light-receiving members comprises a position sensitive diode.

9. An active type range finder apparatus as claimed in claim 8; wherein each of the light emitting members comprises an infrared light emitting diode.

10. A range finder apparatus for a camera, comprising: light projecting means for projecting measuring light to an object to be photographed, the light projecting means having a base, a lead frame disposed on the base, a plurality of light emitting members disposed on the lead frame, and a plurality of control terminals disposed on the base for controlling the light emitting members; a light receiving element having a plurality of light receiving members and being disposed at a base length from the light projecting element for receiving measuring light reflected by the object and producing an output representative of the received measuring light, each of the light emitting members having an extension region extending along an axis which is parallel to a direction of the base length, and the lead frame and the control terminals having end portions, none of which lie on each said axis of the extension regions of the light emitting members; and computing means for computing the distance to the object from the output of the light receiving element; wherein the light emitting members emit light to a subject which reflects the light to form an image on the light receiving element, and scattered light from the end portions of the lead frame and the control terminals forms an image outside of the light receiving members.

11. A range finder apparatus as claimed in claim 10; wherein each of the light emitting members member comprises an infrared light emitting diode.

12. A range finder apparatus as claimed in claim 10; wherein the light receiving element comprises a base and a lead frame disposed on the base; and wherein the plurality of light receiving members are disposed on the lead frame.

13. A range finder apparatus as claimed in claim 12; therein each of the light receiving members member comprises a position sensitive diode.

14. A range finder apparatus as claimed in claim 10; wherein the lead frame comprises a plurality of indented portions, and the light emitting members are disposed in the indented portions.

15. A light projecting element for a range finder apparatus including a light receiving element having a plurality of light receiving members and being disposed at a base length from the light receiving element, the light projecting element comprising: a base, a lead frame disposed on the base, a plurality of light emitting members disposed on the lead frame for emitting light to a subject, and a plurality of control terminals disposed on the base for controlling the light emitting members; wherein each of the light emitting members has an extension region extending along an axis which is parallel to a direction of the base length, and the lead frame and the control terminals have end portions, none of which lie on each said axis of the extension regions of the light emitting members, so that the light emitting members emit light to a subject which reflects the light to form an image on the light receiving element, and scattered light from the end portions of the lead frame and the control terminals forms an image outside of the light receiving members.

16. A light projecting element as claimed in claim 15; wherein the lead frame comprises a plurality of indented portions, and the light emitting members are disposed in the indented portions.

17. A light projecting element as claimed in claim 15; wherein each of the light emitting members comprises an infrared light emitting diode.

18. An active type range finder apparatus, comprising: a light projecting element having a base, a lead frame disposed on the base and having end portions, a plurality of light emitting members disposed on the lead frame for emitting light to a subject, and a plurality of control terminals having end portions and being disposed on the base for outputting control signals to control the light emitting members; and a light receiving element having a plurality of light receiving members and being disposed at a base length from the light projecting element for receiving light reflected by the subject; wherein the end portions of the lead frame and control terminals are positioned such that when the control terminals output a control signal to the light emitting members, the light emitting members emit light to a subject which reflects the light to form an image on the light receiving element, and the end portions of the lead frame and the control terminals which emit scattered light from an image only outside of the light receiving members.

19. An active range finder apparatus as claimed in claim 18; wherein all of the end portions of the lead frame and the control terminals are disposed outside an extension region of the light emitting members in a direction of the base length.

* * * * *